US012154552B1

(12) United States Patent
Lester et al.

(10) Patent No.: US 12,154,552 B1
(45) Date of Patent: Nov. 26, 2024

(54) ANNOTATING AND MODELING NATURAL LANGUAGE SEMANTICS THROUGH ANNOTATION CONVERSION

(71) Applicant: Interactions LLC, Franklin, MA (US)

(72) Inventors: Brian David Lester, Livonia, MI (US); Srinivas Bangalore, Morristown, NJ (US)

(73) Assignee: Interactions LLC, Franklin, MA (US)

( * ) Notice: Subject to any disclaimer, the term of this patent is extended or adjusted under 35 U.S.C. 154(b) by 362 days.

(21) Appl. No.: 17/462,889

(22) Filed: Aug. 31, 2021

(51) Int. Cl.
*G10L 15/18* (2013.01)
*G10L 15/06* (2013.01)
*G10L 15/16* (2006.01)

(52) U.S. Cl.
CPC ........ *G10L 15/1815* (2013.01); *G10L 15/063* (2013.01); *G10L 15/16* (2013.01); *G10L 2015/0635* (2013.01)

(58) Field of Classification Search
None
See application file for complete search history.

(56) References Cited

U.S. PATENT DOCUMENTS

| | | | |
|---|---|---|---|
| 11,551,666 B1 * | 1/2023 | Bissell | G10L 15/22 |
| 2017/0278510 A1 * | 9/2017 | Zhao | G06F 40/30 |
| 2019/0371307 A1 * | 12/2019 | Zhao | G10L 15/26 |

OTHER PUBLICATIONS

Translation CN-110413743-A from espacenet published on Nov. 2019. (Year: 2019).*
Bahdanau, D. et al., "Neural Machine Translation by Jointly Learning to Align and Translate," ICLR 2015, Mar. 22, 2015, pp. 1-15.
Luong, M-T. et al., "Effective Approaches to Attention-based Neural Machine Translation," Proceedings of the 2015 Conference on Empirical Methods in Natural Language Processing, Sep. 2015, pp. 1412-1421.

* cited by examiner

*Primary Examiner* — Paras D Shah
*Assistant Examiner* — Kristen Michelle Masters
(74) *Attorney, Agent, or Firm* — Fenwick & West LLP (57) ABSTRACT

A natural language understanding (NLU) system generates in-place annotations for natural language utterances or other types of time-based media based on stand-off annotations. The in-place annotations are associated with particular subsequences of an annotation, which provides richer information than stand-off annotations, which are associated only with an utterance as a whole. To generate the in-place annotations for an utterance, the NLU system applies an encoder network and a decoder network to obtain attention weights for the various tokens within the utterance. The NLU system disqualifies tokens of the utterance based on their corresponding attention weights, and selects highest-scoring contiguous sequences of tokens between the disqualified tokens. In-place annotations are associated with the selected sequences.

20 Claims, 7 Drawing Sheets

ANNOTATING AND MODELING NATURAL LANGUAGE SEMANTICS THROUGH ANNOTATION CONVERSION

FIELD OF ART

This disclosure relates generally to the field of natural language understanding, and more specifically, to use of machine learning techniques to transform stand-off annotations to in-place annotations within-time based media.

BACKGROUND

The task of natural language understanding (NLU) involves the assignment of semantically interpretable labels to a user's utterance (i.e., textual or spoken expression). These labels can take the form of intent labels, entity labels, or speech/dialog acts, among others. Typically, a corpus of utterances is annotated with these labels and machine learning models (such as Deep Neural Networks (DNNs)) are trained on such corpora to predict the labels based on the features extracted from the input sentence.

The set of semantically interpretable labels could depend on the specifics of an application, or could be defined by industry verticals, or could be general-purpose so as to apply to a broad range of domains. As one example from a reservation application in the hospitality industry, the utterance "I would like to make a reservation for two nights for two people arriving on December 22" could be labeled in an in-place annotation scheme as: <reserve> I would like to make a reservation </reserve> for <num_nights> two nights</num_nights> for <num_people>two people</num_people> arriving on <arrival_date>December 22</arrival_date>. In the in-place annotation of the prior example, each of the semantic labels <reserve>, <num_nights>, <num_people>, and <arrival_date> bracket portions of text and thereby indicate the text portions to which the various labels apply.

However, annotating a large corpus of sentences using this method of annotation is time consuming and tedious, requires expertise, and entails significant expense. The accuracy of NLU modeling depends on the availability of large sets of such annotated corpora. Since NLU models do not transfer well from one domain to another, separate models typically need to be trained for every distinct domain. The time and expense required for training for all required domains places a heavy burden on organizational budgets.

In contrast, an alternate and simpler method of annotation-known as "stand-off" notation-significantly reduces the time and effort required for annotation. Stand-off annotation accomplishes the task of annotation at scale, in that it applies to an utterance as a whole, rather than to specific portions thereof, and thus a label can be specified for a human annotator significantly more quickly than with in-place annotation, e.g., using a single selection menu. However, the information provided by an in-place annotation scheme is richer than that of stand-off annotation, since the individual tokens (e.g., words) of the utterances are labeled with the elements of semantics, unlike in the stand-off scheme, which associates labels with an utterance as a whole. The in-place annotations provide a convenient way to introduce new entities in locations that are marked by entity labels, thus aiding speech recognition and NLU modeling, and allow for associations between entities and intents in a straightforward manner. Unfortunately, as noted, in-place annotations are often prohibitively difficult to produce in sufficient volume for model training.

SUMMARY

Machine learning techniques are used to train a model that can transform stand-off annotations to in-place annotations within time-based media. Since stand-off annotations are much less time-consuming and difficult for human annotators to create than in-place annotations, the techniques allow the accomplishment of annotation tasks rapidly with a set of minimally trained annotators, and without an adverse impact on the accuracy of the NLU system. This beneficially combines the ease of standoff annotations with the greater semantic richness of in-place annotations.

More specifically, a natural language understanding (NLU) system generates in-place annotations for natural language utterances based on stand-off annotations. The in-place annotations are associated with particular subsequences of an utterance, which provides richer information than stand-off annotations, which are associated only with an utterance as a whole. To generate the in-place annotations for an utterance, the NLU system applies an encoder network and a decoder network to obtain attention weights for the various tokens within the utterance. The NLU system disqualifies tokens of the utterance based on their corresponding attention weights, and selects highest-scoring contiguous sequences of tokens between the disqualified tokens. In-place annotations are associated with the selected sequences.

More generally, in various embodiments the NLU system can generate in-place annotations for different types of time-based media, such as video, as well as audio utterances. In-place annotations are associated with particular temporal units of a time-based media item (such as a set of consecutive frames of a video), and an encoder network and a decoder network are applied to obtain attention weights for the various temporal units of the time-based media. The NLU system disqualifies temporal units of the utterance based on their corresponding attention weights, and selects highest-scoring contiguous sequences of temporal units between the disqualified temporal units. In-place annotations are associated with the selected sequences.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

Figure 1:
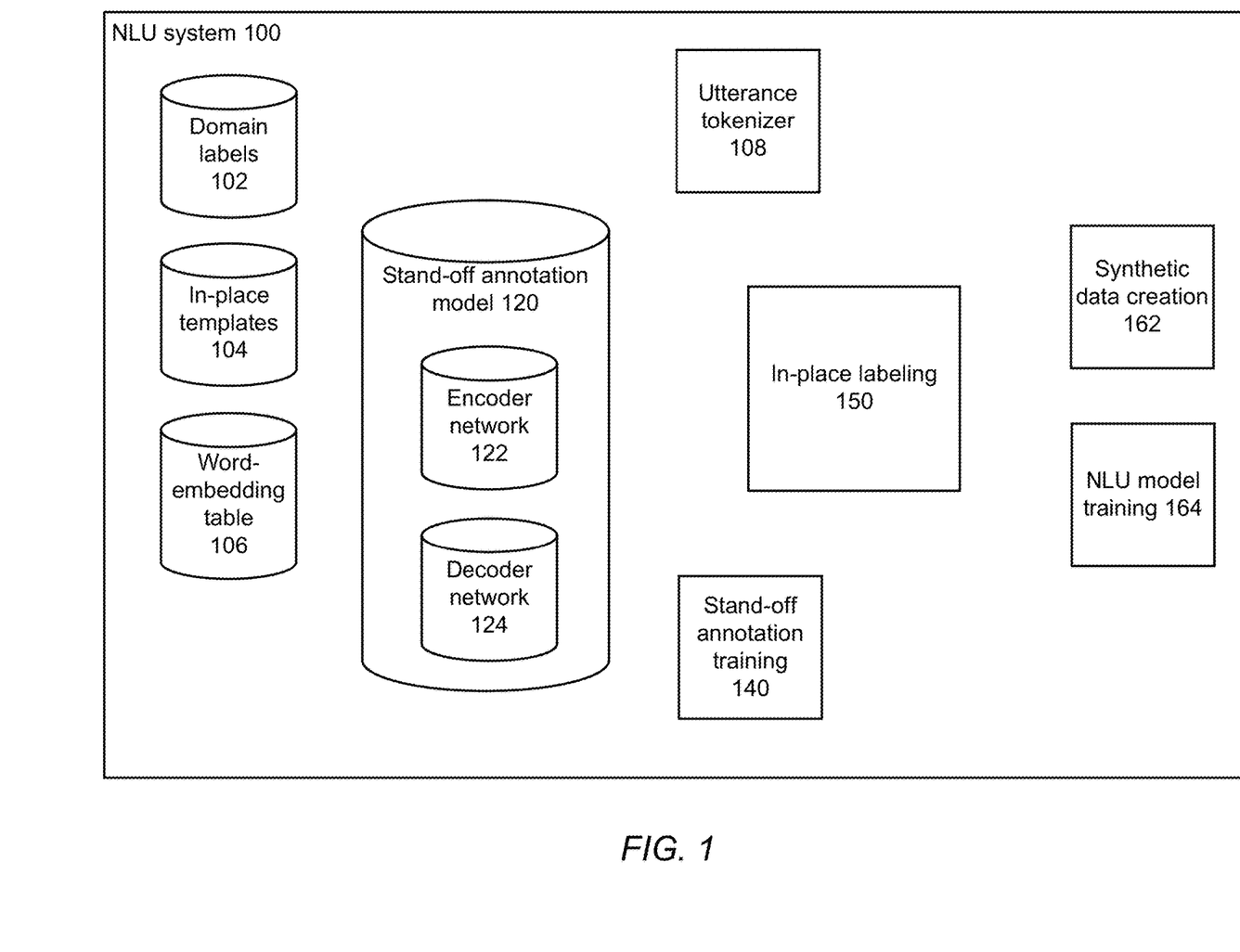
FIG. 1 illustrates a natural language understanding (NLU) system 100, according to some embodiments.

FIG. 1 illustrates a natural language understanding (NLU) system 100, according to some embodiments. The NLU system 100 processes natural language (e.g., audio utterances) within time-based media (that is, media that "plays" over time, such as audio or video). The NLU system 100 illustrated in FIG. 1 trains a stand-off annotation model used to generate stand-off annotations for given utterances, and can also convert the generated stand-off annotations to in-place annotations that provide richer information about semantics within the utterances. The NLU system 100 can be used as a component of a larger NLU environment, such as a component of a server providing NLU services to clients over a wide-area computer network such as the Internet. Alternatively, the NLU system 100 may only indirectly be used in run-time provision of NLU services to clients, such as by providing the in-place annotations needed to train rich NLU models, which in turn may be used by the NLU servers that provide NLU services to clients.

The NLU system 100 includes a set of domain labels 102 for each domain for which NLU capabilities are desired, such as the customer actions in the hospitality industry, or in the airline industry. The domain labels 102 for a given domain represent all possible types of the different units of information that may be conveyed by a user utterance in that domain. For example, in the hospitality industry, the domain labels 102 might include (at least) desired actions (such as "reserve room", "check reservation", or "cancel reservation"), attributes of a reservation (such as "number of nights", "number of guests", "check-in date", or "length of reservation"), and the like. Similarly, in the domain of bill payment, the domain labels 102 might include (at least) desired actions (such as "pay bill" or "cancel service"), attributes of the request (such as "bill number", "payment date", "service name"), and the like.

The NLU system 100 also includes a set of in-place templates 104 for each domain, which set forth the general forms that a specific utterance in that domain could take. For example, the in-place templates 104 for the hospitality industry might include the templates "<reserve> for <num_nights> for <num_people> arriving on <arrival_date>", "<cancel> my room for <reservation_date>", and the like. Each template encompasses many (potentially infinite) different concrete utterances, such as "Reserve for 3 nights for 2 people arriving on July 18$^{th}$", "Reserve for 1 night for 1 person arriving on July 24$^{th}$", and the like, for the template "<reserve> for <num_nights> for <num_people> arriving on <arrival_date>". The use of such abstracted templates enables easily introducing new names within queries and covering a broad range of possible utterances with only a few templates.

The NLU system includes a word-embedding table 106 that transforms a textual token (e.g., an individual word of an utterance) into a sequence of vectors (and, correspondingly, transforms an entire utterance into a sequence of vector sequences). Examples of possible word-embedding tables 106 are Word2Vec and GloVe.

The NLU system additionally includes an utterance tokenizer 108 that identifies within a given utterance the constituent tokens from which it is composed. In some embodiments, a token is a single word within an utterance, although other embodiments can define tokens other than on word boundaries. In the case of utterances that are textual, such as phrases entered in a chat or other message interface, the utterance tokenizer 108 can identify individual tokens based on word break characters, such as one or more whitespaces. In the case of audio (voice) utterances, the utterance tokenizer 108 can identify the tokens in various manners, such as by running a speech-to-text algorithm on the utterance to derive text and then tokenizing the text as above, or by using an audio algorithm to break the audio data into separate audio portions and then obtaining the tokens by separately running a speech-to-text algorithm on each individual audio portion.

The NLU system further includes a stand-off annotation model 120, which, when applied to a given utterance, produces a set of stand-off annotations that are applicable to that utterance as a whole. For example, for the utterance "Reserve for 1 night for 1 person arriving on July 24$^{th}$", application of a stand-off annotation model 120 for the hospitality industry might produce the stand-off annotations <reserve>, <arrival_date>, <num_nights>, and <num_people>. It is understood that an annotation may be preprocessed in various ways before being provided as input to the stand-off annotation model 120.

In one embodiment, the stand-off annotation model 120 has, as sub-components, an encoder network 122 and a decoder network 124. The encoder network 122 takes a first sequence of vectors (e.g., those produced by the word-embedding table 106 for a given textual token) as input and transforms it, producing as output a second sequence of encoder hidden states (the hidden states also being referred to herein as "keys"). The keys contextualize the first sequence of vectors based on the rest of the utterance input sequence. In some embodiments, the encoder network 122 is implemented as a bidirectional Long Short-Term Memory (Bi-LSTM); in others it is implemented using other forms of recurrent neural networks (RNNs) such as a gated recurrent unit (GRU), or other neural network architectures such as transformers or convolutional neural networks (CNNs).

The decoder network 124 takes a first sequence of vectors (e.g., those produced by the encoder network 122 for a given textual token) as input and transforms it, producing as output a set of scores for the possible stand-off annotation labels quantifying the extent to which the labels are applicable to the input. In some embodiments, the encoder network 122 is implemented as a unidirectional LSTM; in others it is implemented using other forms of RNNs such as GRU, or other neural network architectures such as transformers or CNNs.

The decoder network 124 accepts the final hidden state from the encoder network 122 as its initial state and is fed a special "Go" token that signals to the decoder that it should begin the processing of a sequence. Before generating each annotation label for an utterance, the decoder network 124 calculates an "attention" context vector (also referred to herein as the "query") based on its current state and based on the "keys" (the sequence of vectors produced by the encoder). A score for the pair <$k_i$, q>—where $k_i$ is a key of the set of keys, and q is the query—is produced, e.g, via a small Multi-Layer Perceptron using the Hyperbolic Tangent Function (tanh) activation function. (See D. Bahdanau, K. Cho, and Y. Bengio, "Neural Machine Translation by Jointly Learning to Align and Translate", 2015, in International Conference on Learning Representations.) These scores are then normalized to be positive and sum to 1 using a softmax function. The resulting normalized scores are referred to as the "attention weights" and are used later in the creation of in-place annotation. The attention weights are used to create a weighted vectorized sum of the "keys", which represents some mixture of the encoder vectors that are tailored to the context of the "query" vector. This attention context vector is concatenated with the hidden state of the decoder network 124, and a final affine projection is used to produce logit scores over each label L of the domain labels 102. The logit scores are used to calculate cross-entropy loss between the sequence of distributions over the labels that the model outputs and the actual label sequences, and the loss is used to train the model.

A stand-off annotation training module 140 generates the data constituting the encoder network 122 and the decoder network 124 of the stand-off annotation model 120. The stand-off training module 140 takes as input a corpus containing utterances that have already been labeled with stand-off annotations, serving as "ground truth" for the training process. During training, the correct stand-off annotation label for an utterance is fed as input in the next time step (a practice called "teacher forcing"). The training maximizes the likelihood of the output label Y given the input utterance X. In one embodiment, the probability of Y uses an autoregressive formulation $P(Y|X) = \Pi_{t=1}^{T} P(y_t|y_1, \ldots, y_t, X)$. This is equivalent to minimizing the cross entropy between the logit scores of the decoder network 124 and the one-hot encoded gold label for each output token.

Figure 2:
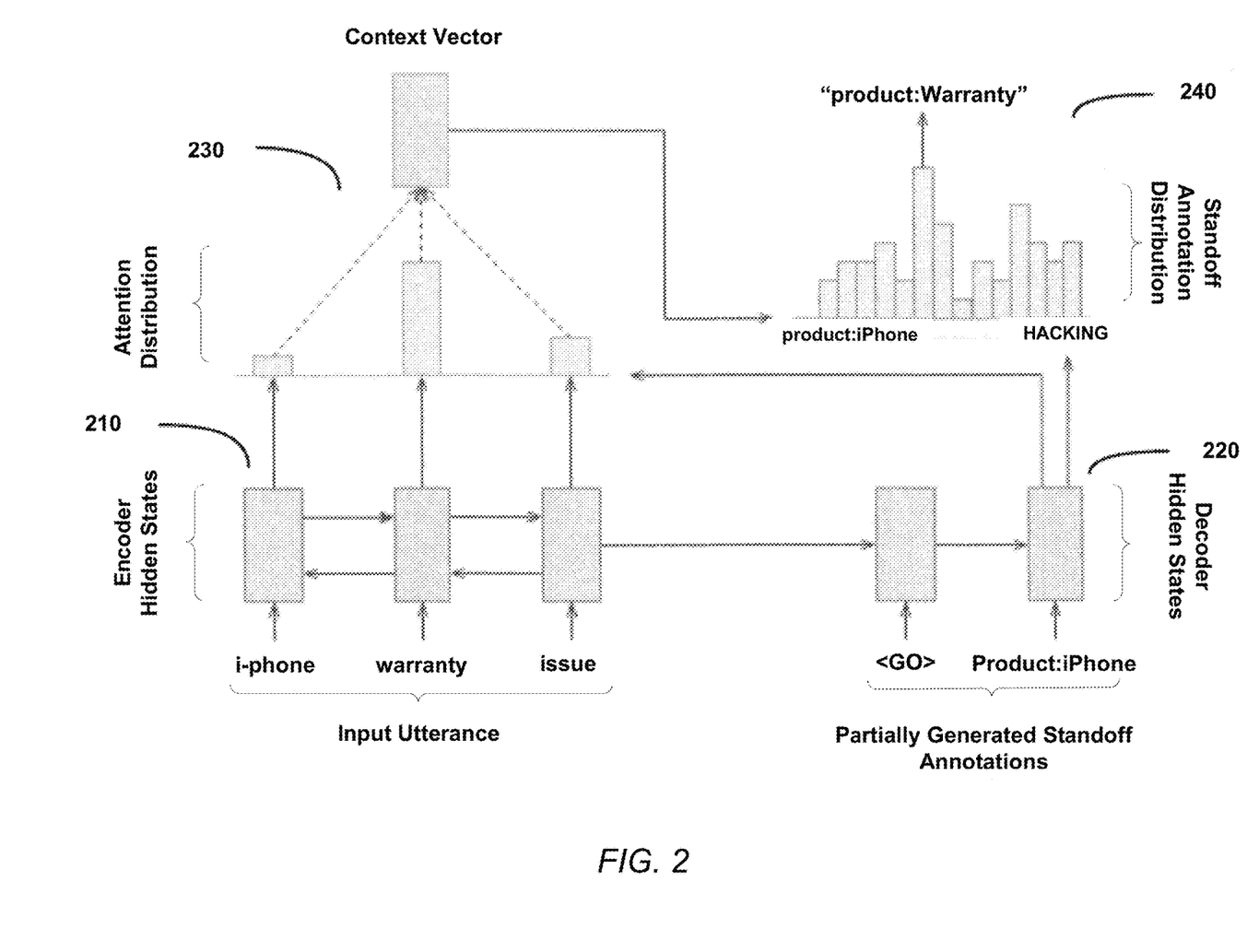
FIG. 2 is a data-flow diagram illustrating the above-discussed operations leading to training of the stand-off annotation model of FIG. 1, according to some embodiments.

FIG. 2 is a data-flow diagram illustrating the above-discussed operations leading to training of the stand-off annotation model 120, according to some embodiments. Operations 210 illustrate the encoding by the (partially-trained) encoder network 122 of utterance token sequences (i.e., the vector sequences produced by the word embedding table 106), and operations 220 illustrate the generation of the stand-off annotation labels using the output of the encoding. Operations 230 illustrate the generation of the attention weights, and operations 240 illustrate the training performed by the stand-off model training module 140.

Returning again to FIG. 1, the NLU system 100 includes an in-place labeling module 150 that converts the stand-off annotations produced by the stand-off annotation model 120 for an utterance to in-place annotations for that utterance. By ordering the annotations for the various labels 102 in a consistent order, the stand-off classification task is recast as a sequence transduction task. In one embodiment, a fixed order of the annotations for labels is determined by minimizing the perplexity of a language model to maximize information that previous annotations supply to the generation of the next one.

The in-place labeling module 150 uses the trained encoder network 122 to generate the "keys" (i.e., the encoder network output as discussed above), then to generate annotation label scores using the trained decoder network 124. The in-place labeling module 150 records the attention weights as each annotation label is generated, and this provides an alignment between the annotation label and the utterance text that was relevant in making that decision, so that labels can be associated with particular portions of the utterance text.

The attention weights from the decoder network 124 serve as stand-off labels for an utterance as a whole. However, in order to obtain in-place annotations, the stand-off labels need to be associated with specific token sequences within the utterance. Accordingly, the in-place labeling module 150 calculates the threshold value that each token would take on if the distribution were uniform—that is, if all the tokens had the same attention value. The in-place labeling module 150 disqualifies all tokens whose attention weights are below the threshold (1/ #tokens) from being considered as eligible sequences for labeling, given that the low attention value indicates low importance. After the disqualification, the in-place labeling module 150 identifies all contiguous sequences of tokens formed from the remaining (non-disqualified) tokens and scores each such sequence, picking the sequence with the highest score. The in-place labeling module 150 computes the score for a sequence by summing the attention weights for the constituent tokens of the sequence and scaling the sum by the length of the sequence. (The scaling accounts for the fact that putting some attention weight on one token means that weight must be removed from the other tokens due to the constraint that the attention weights sum to 1.)

The in-place labeling module 150 then creates in-place annotations based on the selected highest-scoring token sequences. The sequence selection process produces offsets in the text of the input utterance that constitute a sequence, and the label that is generated at that time step is used as the label for the in-place annotation.

Figure 3A:
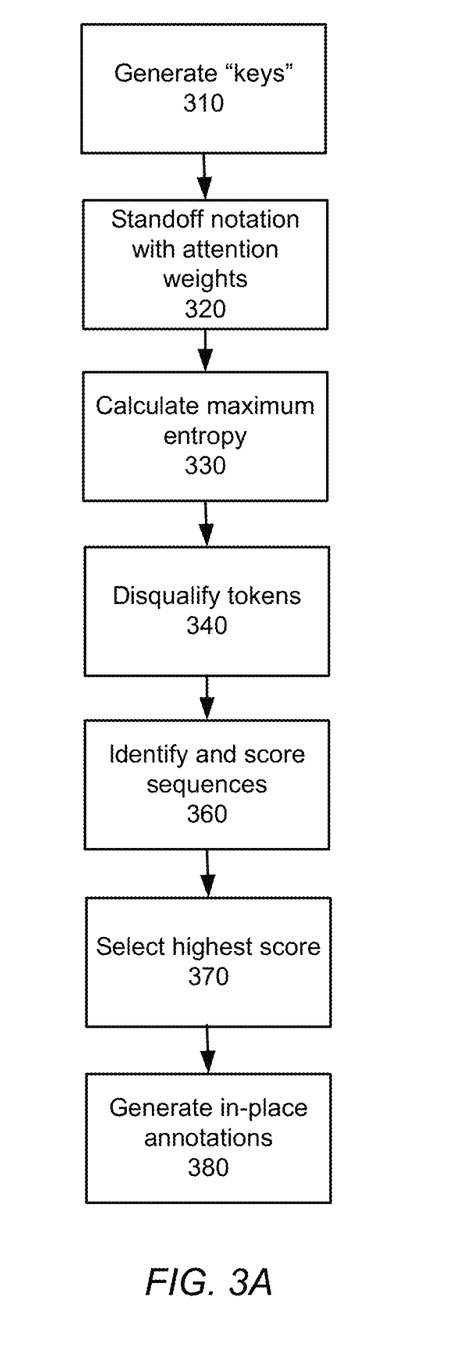
FIG. 3A is a flowchart summarizing the operations of the in-place labeling module of FIG. 1 for generating in-place annotations from a set of standoff annotations, according to some embodiments.

FIG. 3A is a flowchart summarizing the above-discussed operations of the in-place labeling module 150 for generating in-place annotations from a set of standoff annotations, according to some embodiments. Given the receipt of an utterance, the in-place labeling module 150 uses the encoder network 122 to generate 310 the keys, then uses the decoder network 124 to generate 320 the stand-off labels and their corresponding attention weights. The in-place labeling module 150 calculates 330 a maximum entropy value (i.e., 1/ #tokens) and disqualifies 340 any tokens of the utterance that fall below that threshold. The in-place labeling module 150 identifies 360 and scores all contiguous sequences of the non-disqualified tokens, selecting 370 the highest-scoring of those sequences as sequences to annotate, and generating 380 in-place annotations for those sequences by associating them with the labels 102 that produced them.

Figure 3B:
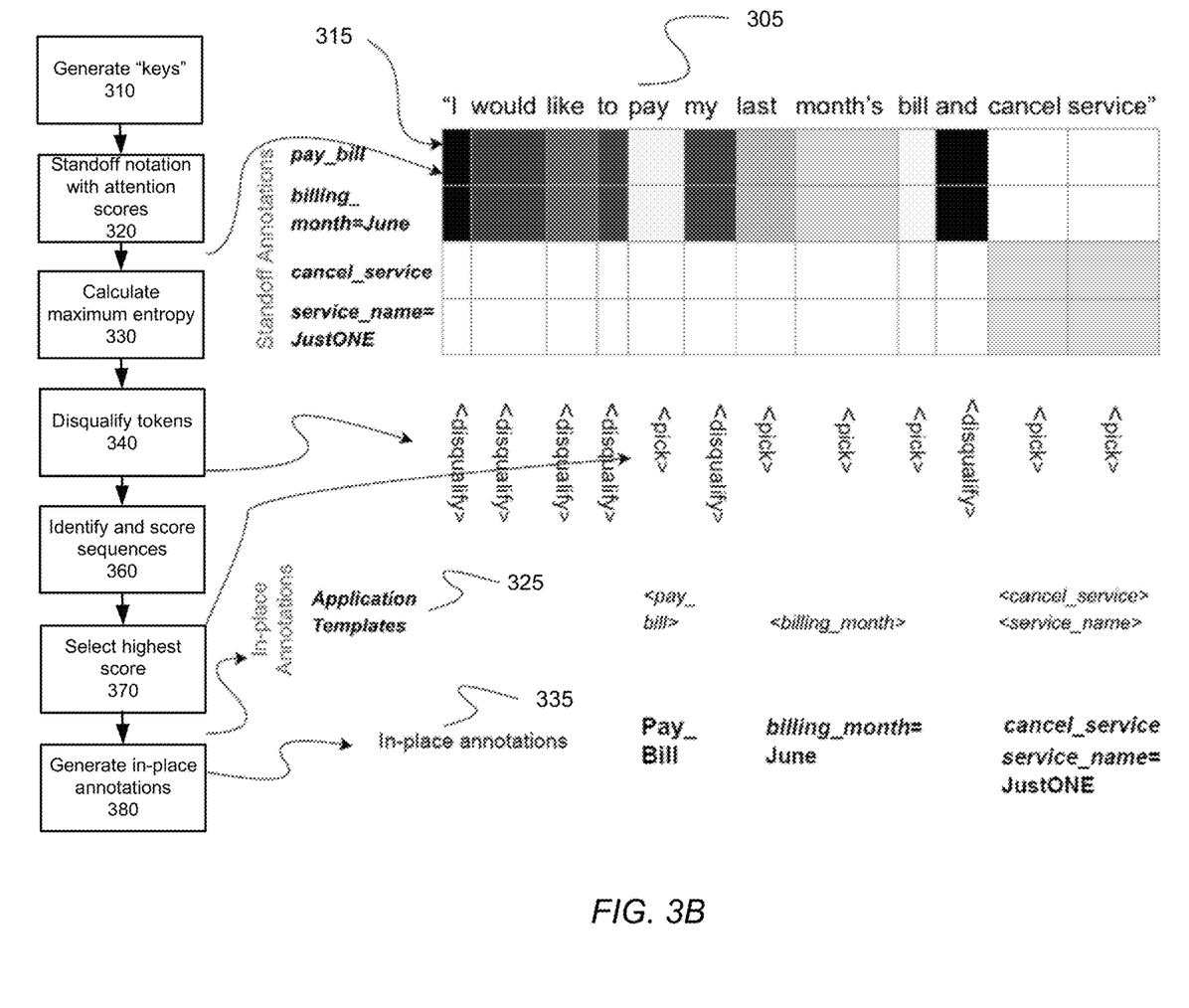
FIG. 3B illustrates the operations of the in-place labeling module for a specific simplified example within the context of FIG. 3A.

FIG. 3B illustrates the operations of the in-place labeling module 150 for a specific simplified example within the context of FIG. 3A. The example depicts the generation of in-place annotations from an utterance 305, using the model generated from standoff annotations with attention weights 315, and an abstracted in-place annotations template 325 from the templates 104 of FIG. 1, to produce in-place annotations 335 for the utterance. The possible domain labels 102 for this simplified example are "pay_bill", "billing_month", "cancel_service", and "service_name". Each word token of the utterance 305 (e.g., "I", "would", "like", etc.) is assigned a stand-off annotation score for each of the possible labels, with darker shades indicating lower scores. In the example, the first through fourth ("I" through "to"), sixth ("my"), and tenth ("and") are disqualified due to low scores. The sequences of tokens between those disqualified tokens—namely, the fifth token ("pay"), seventh to ninth token ("last", "month's", and "bill"), and eleventh through twelfth tokens ("cancel" and "service")—are assigned labels for in-place annotations ("pay_bill", "billing_month", and "cancel_service", respectively). Accordingly, the resulting utterance annotated with in-place annotations is "I would like to <pay_bill>pay</pay_bill> my<billing_month>last month's bill</billing_month=June> and <cancel_service>cancel service</cancel_service>".

Figure 4A:
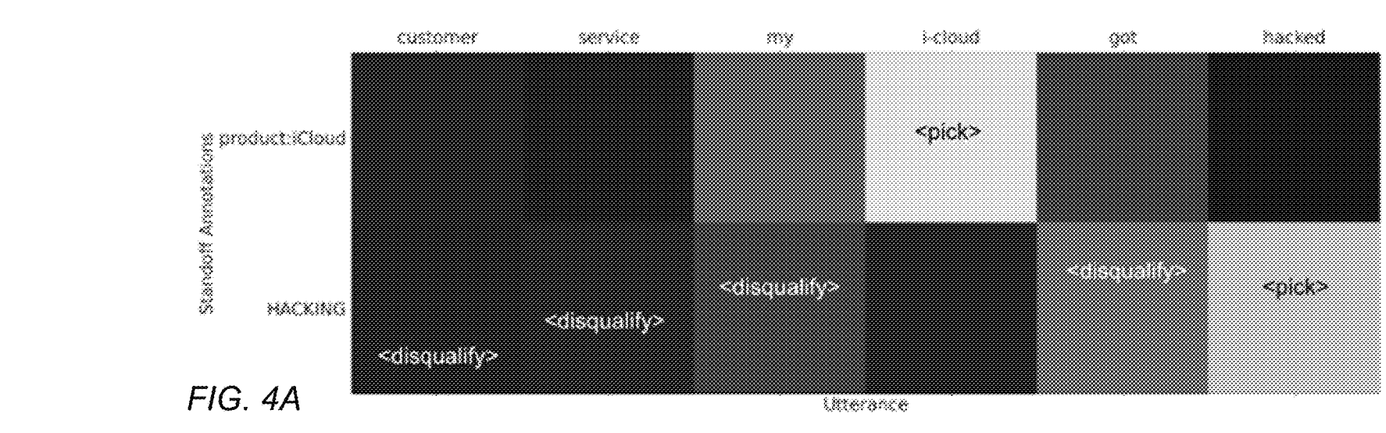
FIGS. 4A to 4D illustrate additional examples of labeling utterances with in-place annotations.
Figure 4B:
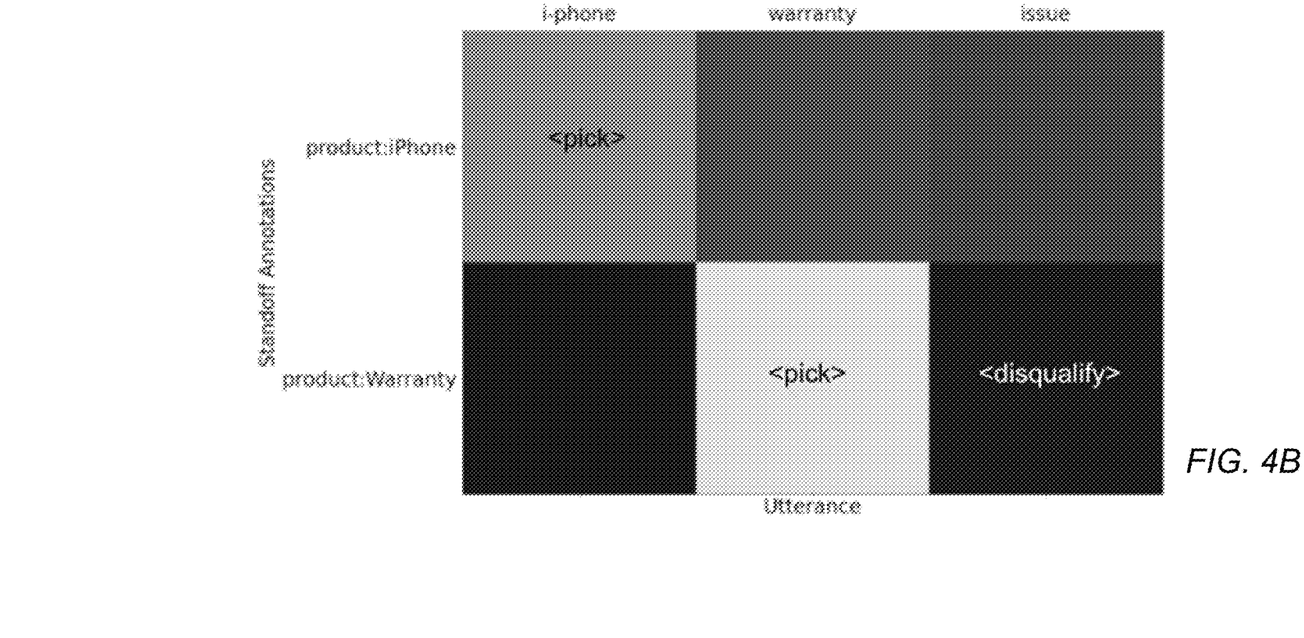
Figure 4C:
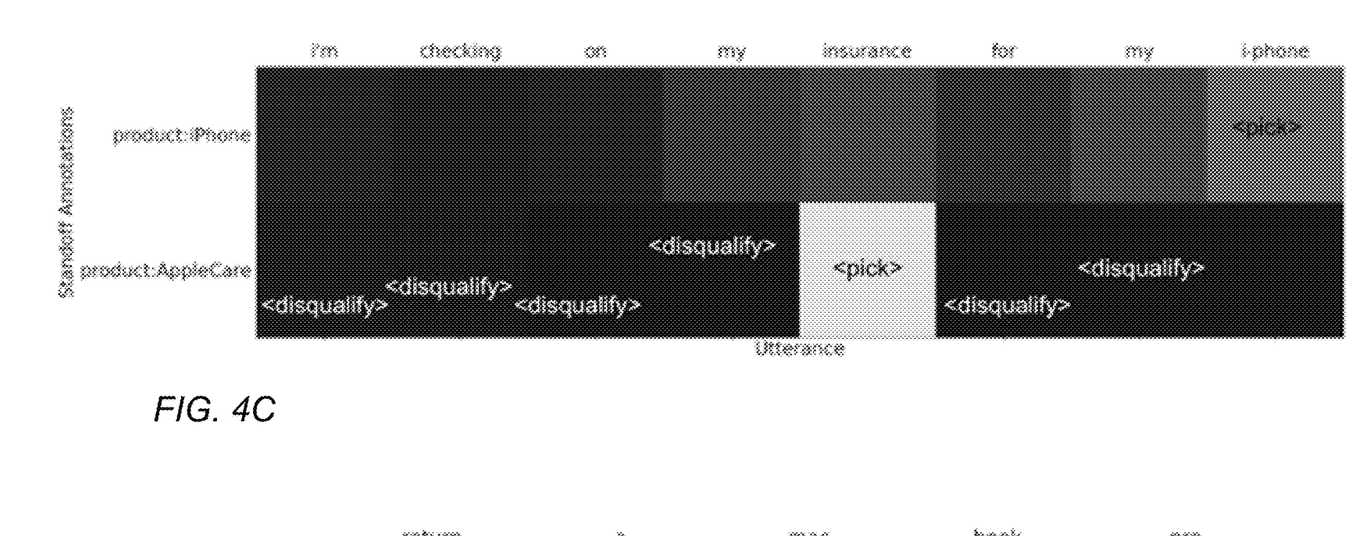
Figure 4D:
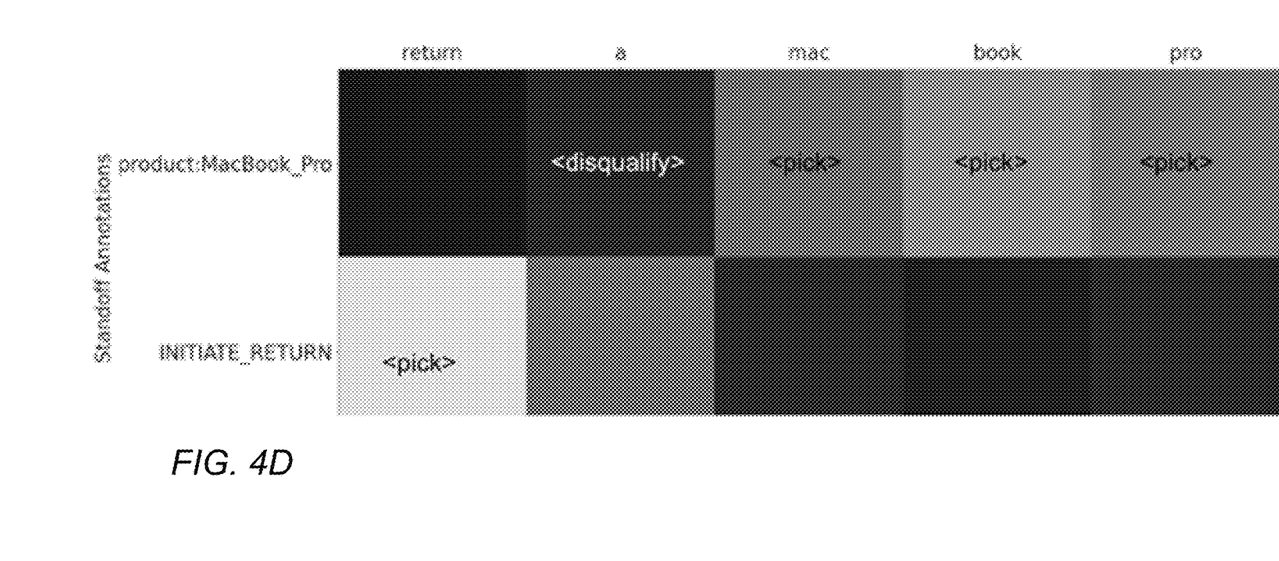

FIGS. 4A to 4D illustrate additional examples of labeling utterances with in-place annotations, respectively producing the annotated utterances "customer service my<product: iCloud>i-cloud</product:iCloud> got <HACKING>hacked</HACKING>" (FIG. 4A), "<product:

iPhone>i-phone</product:iPhone> <product: Warranty>warranty</product: Warranty> issue" (FIG. 4B), "I'm checking on my<product: AppleCare>insurance</product: AppleCare> for my<product:iPhone>i-phone</product:iPhone>" (FIG. 4C), and "<INITIATE_RETURN>return</INITIATE_RETURN> a <product: MacBookPro>mac book pro</product:MacBookPro>" (FIG. 4D).

Returning again to FIG. 1, the NLU system may optionally include additional modules that use the utterances-once labeled by the in-place labeling module 150 with in-place annotations—to perform additional processing. For example, an NLU training module 164 can train additional NLU models (e.g., sequence taggers) using the utterances with in-place annotations as the training set. Since the utterances have now been annotated with the richer in-place annotations (as opposed to the less-rich stand-off annotations), the resulting trained model can be correspondingly more accurate than a model trained on utterances with stand-off annotations. A synthetic data creation module 162 can use equivalence classes for an ontology for the domain of interest to generate additional training set utterances for use by the NLU model training module 164, by substituting equivalent terms for annotated portions of utterances with in-place annotations. For example, referring to the above example annotated utterance "I would like to <pay_bill>pay</pay_bill> my<billing_month>last month's bill</billing_month=June> and <cancel_service>cancel service</cancel_service>", the synthetic data creation module 162 might refer to an ontology for the bill payment domain and generate related synthetic utterances by replacing the month "June" with other months, the action "cancel_service" with other actions from the same equivalence class (e.g., "check_balance").

The above describes operations on audio utterances to convert stand-off annotations to in-place annotations. In various embodiments, analogous operations are performed for different types of time-based media (not merely audio), such as video. In these embodiments, the time-based media is segmented into temporal units (e.g., consecutive sets of frames for a video), and a sequence of features is derived from the various temporal units. An encoder network is used to generate hidden states given the feature sequences, and a decoder network is used to compute attention weights. The attention weights of the different temporal units are used to selectively disqualify certain of the temporal units, and contiguous sequences of non-disqualified temporal units are scored. In-place annotations are generated for highest-scoring ones of the contiguous sequences.

Figure 5:
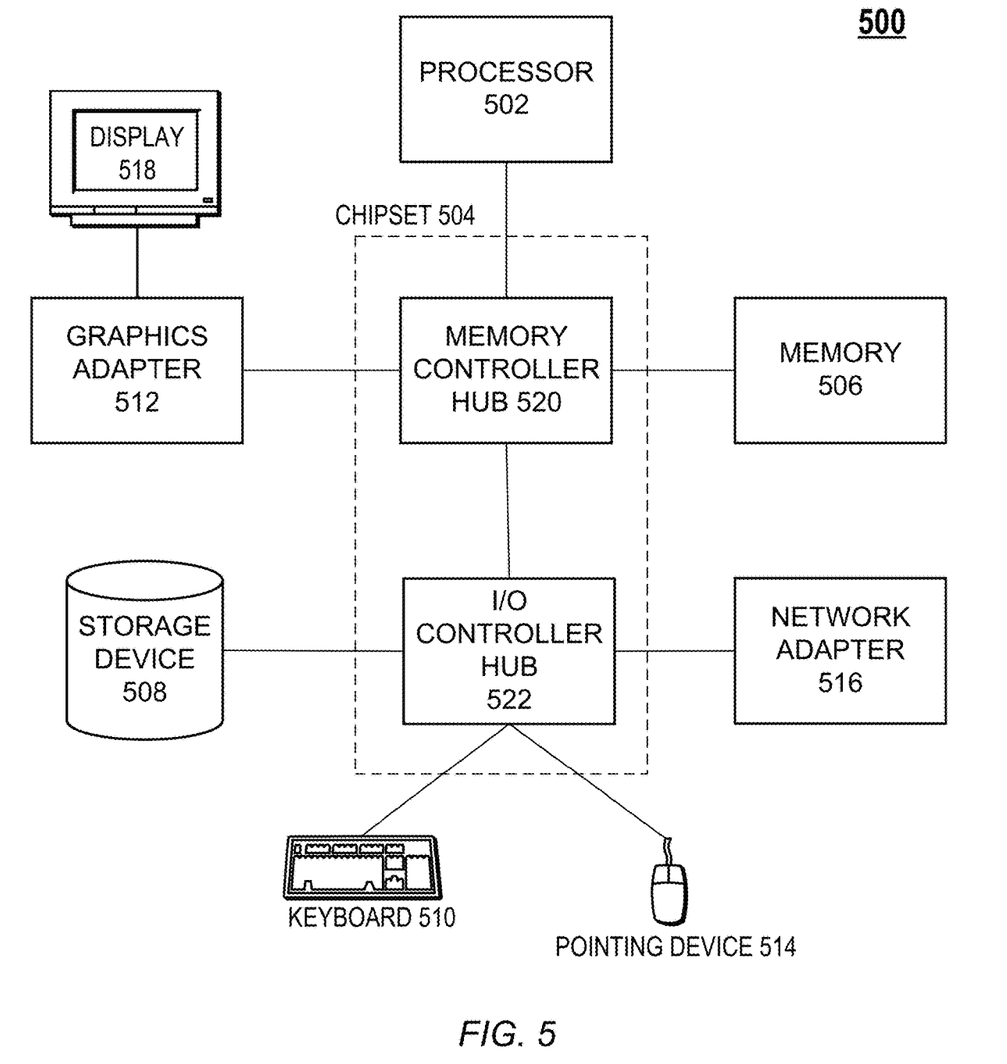
FIG. 5 is a high-level block diagram illustrating physical components of a computer used as part or all of the NLU system from FIG. 1, according to one embodiment.

FIG. 5 is a high-level block diagram illustrating physical components of a computer 500 used as part or all of the NLU system 100 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard 510 or pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method for generating in-place annotations for an utterance, the method comprising:
   training a stand-off annotation model using utterances labeled with stand-off annotations, the training maximizing a likelihood of the label for an input utterance, the stand-off annotation model comprising an encoder network and a decoder network;
   generating stand-off labels for the utterance, the generating comprising:
      generating, using the encoder network, encoder hidden states for text of the utterance, and
      computing, for tokens of the text of the utterance using the decoder network, attention weights based at least in part on the encoder hidden states;
   disqualifying tokens of text of the utterance having attention weights below a threshold attention value;
   identifying contiguous sequences of tokens between disqualified tokens;
   determining a score for each contiguous sequence of tokens based on an aggregate attention weight for tokens of the contiguous sequence scaled by a length of the contiguous sequence;
   selecting one or more of the contiguous sequences having highest scores; and
   generating in-place annotations for the selected one or more contiguous sequences.

2. The computer-implemented method of claim 1, wherein computing attention weights comprises computing an attention weight for <token, label> pair, where the tokens are the tokens of the text of the utterances, and the labels are from a predefined set of labels for a domain.

3. The computer-implemented method of claim 1, wherein disqualifying the tokens comprises determining whether the attention weights are below an attention value resulting from all tokens having a same attention value.

4. The computer-implemented method of claim 1, further comprising computing scores of the identified contiguous sequences by summing attention weights of tokens of the sequences and scaling the sum by a length of the sequence.

5. The computer-implemented method of claim 1, wherein the in-place annotations correspond to labels drawn from a predefined set of labels for a domain.

6. The computer-implemented method of claim 5, further comprising training an additional NLU model for a first one of the labels using one or more of the in-place annotations that correspond to the first one of the labels.

7. The computer-implemented method of claim 6, wherein the training comprises using equivalence classes of a domain ontology to generate additional training data by substituting equivalent terms for those of the in-place annotations.

8. A non-transitory computer-readable storage medium storing executable computer program instructions that when executed by a computer processor perform actions comprising:
   training a stand-off annotation model using utterances labeled with stand-off annotations, the training maximizing a likelihood of the label for an input utterance, the stand-off annotation model comprising an encoder network and a decoder network;
   generating, using the encoder network, encoder hidden states for text of an utterance;
   computing, for tokens of text of the utterance using the decoder network, attention weights based at least in part on the encoder hidden states;
   disqualifying tokens of text of the utterance having attention weights below a threshold attention value;
   identifying contiguous sequences of tokens between disqualified tokens;
   determining a score for each contiguous sequence of tokens based on an aggregate attention weight for tokens of the contiguous sequence scaled by a length of the contiguous sequence;
   selecting one or more of the contiguous sequences having highest scores; and
   generating in-place annotations for the selected one or more contiguous sequences.

9. The non-transitory computer-readable storage medium of claim 8, wherein computing attention weights comprises computing an attention weight for <token, label> pair, where the tokens are the tokens of the text of the utterances, and the labels are from a predefined set of labels for a domain.

10. The non-transitory computer-readable storage medium of claim 8, wherein disqualifying the tokens comprises determining whether the attention weights are below an attention value resulting from all tokens having a same attention value.

11. The non-transitory computer-readable storage medium of claim 8, the actions further comprising computing scores of the identified contiguous sequences by summing attention weights of tokens of the sequences and scaling the sum by a length of the sequence.

12. The non-transitory computer-readable storage medium of claim 8, wherein the in-place annotations correspond to labels drawn from a predefined set of labels for a domain.

13. The non-transitory computer-readable storage medium of claim 12, the actions further comprising training an additional NLU model for a first one of the labels using one or more of the in-place annotations that correspond to the first one of the labels.

14. The non-transitory computer-readable storage medium of claim 13, wherein the training comprises using equivalence classes of a domain ontology to generate additional training data by substituting equivalent terms for those of the in-place annotations.

15. A natural language understanding (NLU) system comprising:
 a computer processor; and
 a non-transitory computer-readable storage medium storing instructions that when executed by the computer processor perform actions comprising:
  training a stand-off annotation model using utterances labeled with stand-off annotations, the training maximizing a likelihood of the label for an input utterance, the stand-off annotation model comprising an encoder network and a decoder network;
  generating, using the encoder network, encoder hidden states for text of the utterance;
  computing, for tokens of text of the utterance using the decoder network, attention weights based at least in part on the encoder hidden states;
  disqualifying tokens of text of the utterance having attention weights below a threshold attention value;
  identifying contiguous sequences of tokens between disqualified tokens;
  determining a score for each contiguous sequence of tokens based on an aggregate attention weight for tokens of the contiguous sequence scaled by a length of the contiguous sequence;
  selecting one or more of the contiguous sequences having highest scores; and
  generating in-place annotations for the one or more selected contiguous sequences.

16. The NLU system of claim 15, wherein computing attention weights comprises computing an attention weight for <token, label> pair, where the tokens are the tokens of the text of the utterances, and the labels are from a predefined set of labels for a domain.

17. The NLU system of claim 15, wherein disqualifying the tokens comprises determining whether the attention weights are below an attention value resulting from all tokens having a same attention value.

18. The NLU system of claim 15, the actions further comprising computing scores of the identified contiguous sequences by summing attention weights of tokens of the sequences and scaling the sum by a length of the sequence.

19. The NLU system of claim 15, wherein the in-place annotations correspond to labels drawn from a predefined set of labels for a domain.

20. A computer-implemented method for generating in-place annotations for time-based media comprising a sequence of temporal units, the method comprising:
 training a stand-off annotation model using utterances labeled with stand-off annotations, the training maximizing a likelihood of the label for an input utterance, the stand-off annotation model comprising an encoder network and a decoder network;
 generating, using the encoder network, encoder hidden states for temporal units of the media;
 computing, for temporal units of the media using the decoder network, attention weights based at least in part on the encoder hidden states;
 disqualifying temporal units of the media having attention weights below a threshold attention value;
 identifying contiguous sequences of temporal units between disqualified temporal units;
 determining a score for each contiguous sequence of temporal units based on an aggregate attention weight for temporal units of the contiguous sequence scaled by a length of the contiguous sequence;
 selecting one or more of the contiguous sequences having highest scores; and
 generating in-place annotations for the selected one or more contiguous sequences.

* * * * *